United States Patent [19]

Schoeneberg

[11] Patent Number: 5,103,463
[45] Date of Patent: Apr. 7, 1992

[54] METHOD AND SYSTEM FOR ENCODING AND DECODING FREQUENCY SHIFT KEYING SIGNALS

[75] Inventor: Rainald Schoeneberg, Hamburg, Fed. Rep. of Germany

[73] Assignee: Comacs, Ltd., Orlando, Fla.

[21] Appl. No.: 575,307

[22] Filed: Aug. 30, 1990

[51] Int. Cl.$^5$ .................................... H04L 27/10
[52] U.S. Cl. ............................ 375/51; 375/88; 332/118; 329/315
[58] Field of Search .............. 375/44, 45, 47, 51, 375/62, 78, 88, 90; 455/110, 112, 113; 332/100, 101, 117, 118; 329/300, 302, 315, 318; 328/27

[56] References Cited

U.S. PATENT DOCUMENTS

| | | | |
|---|---|---|---|
| 4,003,001 | 1/1977 | Jones, Jr. | 332/101 |
| 4,066,841 | 1/1978 | Young | 375/49 |
| 4,516,087 | 5/1985 | Bruene | 375/47 |
| 4,517,519 | 5/1985 | Mukaiyama | 375/45 |
| 4,682,123 | 7/1987 | Loper et al. | 455/110 |
| 4,700,364 | 10/1987 | Miyazaki et al. | 375/49 |

*Primary Examiner*—Stephen Chin
*Attorney, Agent, or Firm*—James H. Beusse

[57] ABSTRACT

A system and method for encoding and decoding a frequency-shift keyed data signal for transmission over a non-ideal communications channel that utilizes phase-coherently combined halfwave segments of sinewaves with a finite number of different frequencies and equal amplitudes. A stream of data characters is encoded into a transmit sequence $\{S(n)\}$ of positive numbers which defines an ac signal of halfwave segments of sinewaves of fixed, preselected amplitude. The ac signal encoding the stream of data characters is transmitted over the communications channel and received as a perturbed ac signal. The received signal is identified by consecutively determining the time durations between peak values or between zero crossings of each segment yielding a receive sequence $\{E(n)\}$ of positive numbers. All or parts of this receive sequence are then compared with each of a set of preselected, stored sequences, each representing a stream of none, one or more data characters. The actual stream of data characters transmitted is selected as the stream producing the smallest errors, within a preselected bound, in comparing the stored stream-representing sequences to all or parts of the receiver sequence.

21 Claims, 6 Drawing Sheets

METHOD AND SYSTEM FOR ENCODING AND DECODING FREQUENCY SHIFT KEYING SIGNALS

BACKGROUND OF THE INVENTION

1. Field of the Invention

The invention relates to data transmission via frequency-shift keying, and more particularly to a method and system for fast and reliable encoding and decoding of arbitrary frequency-shift keying signals.

2. Brief Description of the Prior Art

It is common to provide electronic data terminal equipment, such as computers, printers, etc., located at some distance from each other, and which interact with each other to exchange information. For the exchange of data, it is necessary to use a physical representation of the data in the form of signals adapted to the particular transmission link. It is known to transmit data by means of a time sequence of electrical currents or voltages. If cables are used as the transmission link, both ac and dc signals can be used. Only ac signals are, however, possible for communications channels such as telephone and radio. For transmission of data, a unique pattern representing information is impressed on a carrier at the transmitter end, which must be recognized at the receiver end. Problems are present in pattern recognition at the receiver end since non-ideal communications channels usually distort the impressed pattern due to channel characteristics. For example, a typical speech channel ordinarily has a bandwidth of only about 300 Hz to 3400 Hz, a frequency-dependent amplitude response and phase response, and frequency-shifts of a few Hertz.

The ac patterns are generated primarily by means of a controlled manipulation of one or more of the three parameters: phase, amplitude, and frequency of sinusoidal oscillations. In the QAM method (quadrature amplitude modulation) which is used in accordance with CCITT V.29 and V.32, the phase and amplitude of a constant-frequency sinewave are varied. In frequency-shift keying (FSK) methods, which are applied in accordance with CCITT V.21 for example, a sinewave is switched stepwise from one frequency to another frequency at zero crossings or at peaks, the transition thus being effected without a phase jump.

The fundamental encoding formula for frequency-shift keying is simple: one digital bit combination is represented by one frequency and another digital bit combination is represented by another frequency. A particular frequency in the communications channel at a particular time thus corresponds exactly to one bit combination.

The reliability of frequency-shift keying methods is relatively high because phase and amplitude variations that may occur in non-ideal communications channels have no effect on the information content of the signal. The disadvantage of FSK methods so far is a rather low transmission speed (e.g., 300 bits/second according to CCITT V.21). This is explained primarily by the restricted frequency band of about 3100 Hz of speech channels. A faster switching between the frequencies for the bit combinations according to decoding techniques known heretofore requires, however, an even larger frequency interval in order to be able to recover the information reliably at the receiver end.

Prior art decoding techniques in FSK methods commonly use analog or digital phase-locked loops (PLLs) which have relatively long transient response times. More recent versions of frequency-shift keying methods (e.g., minimum-shift keying (MSK) and fast frequency-shift keying (FFSK)) exploit the fact that frequencies are represented by zero crossing intervals, and use zero crossing detectors in combination with counters as frequency discriminators. However, these count values do not reproduce the frequencies correctly, especially near the keying times. Namely, in the time range of the neighboring frequencies the originally time-limited frequencies ordinarily exhibit signal residues (caused by varying group delays, among other things) which lead to mutual interference. Therefore, this fact has made it necessary to choose the intervals of the keying times relatively large in comparison with the potentially usable keying times, so that even in the more recent of frequency-shift keying methods, a comparatively low transmission speed of at most 2400 bits/second has been possible.

The problem addressed by the invention is to improve the encoding and decoding technique for frequency-shift keying methods of the above-cited type so that, in particular, frequencies being defined near the keying times are recognized quickly and reliably, and to present a system for implementation of the method that can be produced economically, has low susceptibility to interference, and which makes possible fast and reliable transmission of data in non-ideal communications channels.

SUMMARY OF THE INVENTION

Mathematically, the frequency-shift keying method of the invention converts a binary data stream into coded bit combinations, and then into an ac signal which may be considered to arise from the phase-compatible joining of halfwaves from a finite set of sinewaves of equal amplitude. A sinewave-based frequency-shift keying method and system may use halfwaves from zero crossing to zero crossing, whereas a cosine-based frequency-shift keying method and system may use halfwaves from peak to peak. Thus, the cosine-based method joins halfwaves to each other not only continuously, but also differentially.

Consequently, except for the constant amplitude and the polarity, such an information bearing ac signal is uniquely characterized by a sequence $\{S(n)\}$ of positive numbers, where $S(n)$ represents, in sequence, the time duration from one to the next zero crossing or from one peak value to the next peak value. Since neither the amplitude nor the polarity has any information content in frequency-shift keying methods, the binary data stream is completely encoded in the sequence $\{S(n)\}$.

Only a finite number of sinewaves is available; therefore, $S(n)$ can only assume a finite number of values. Furthermore, the $S(n)$ must logically represent frequencies in the passband of a typical communications channel of 300 Hz to 3400 Hz; thus $S(n)$ must lie between times of about 1666 $\mu$s and 148 $\mu$s.

Variations of the frequency-shift keying method of the invention are distinguished by the time values that are used for $S(n)$, which bit combinations are used, and how many consecutive $S(n)$ numbers are assigned to a single bit combination of the data stream and consequently are equal.

The ac signal thus assigned to the binary data stream and transmitted over a non-ideal communications channel generates an ac signal at the receiving end of the channel displaced in time by the propagation delay. According to the invention, a sequence {E(n)} is determined for the ac signal at the receiver end by counting, in sequence, the time intervals between one zero crossing and the next zero crossing or between one peak value and the next peak value.

The system in accordance with the invention provides a zero crossing detector, or a differentiator with a zero crossing detector connected after it to accomplish this task. The zero crossings determined either way are evaluated by means of counters.

The decoding at the receiver end of the ac signals that are generated by frequency-shift keying methods requires an adequate reconstruction of the sequence {S(n)}. The reconstruction is done according to the invention by means of the thus obtained sequence {E(n)} as follows: using prescribed s, t, and constant coefficients A(−s), A(−s+1),..., A(0),..., A(t-1), A(t) which satisfy the condition A(−s)+A(−S+1) +. .. +A(0)+... +A(t−1)+A(t)=1, the optimization problems $$|(F(n))| = \text{MINIMUM}$$

where F(n), the error margin of the linear approximation of E(n), is defined by $$F(n) = E(n) - \sum_{j=-s}^{+t} A(j)X(n + j) \quad (1)$$

are solved for all or parts of the sequence {E(n)} for the unknown as X(n), which are only allowed to assume the same values as the S(n) and must obey the same law of formation as that of the sequence {S(n)}. Here, |(F(n))| denotes an arbitrary real valued measure for finite sequences used as a measure of affinity in the context of the invention. For example:

$$||(F(n))|| = \sum_n |F(n)| \quad (2)$$

$$||(F(n))|| = \max_n |F(n)| \quad (3)$$

$$||(F(n))|| = \left( \sum_n |F(n)|^2 \right)^{\frac{1}{2}} \quad (4)$$

Although the solution of these optimization problems is more or less tedious, depending on the communications channel and the frequency-shift keying method being used, for arbitrary coefficients A(j) there is always a solution, since, for example, the X(n) are capable of only a finite number of values.

According to the invention, the obtained solutions (X(n) are considered all or parts of the sequence {S(n)} defining the transmitted ac signal, and are then decoded into binary data according to the law of encoding of the particular frequency-shift keying method being used.

The constant coefficients A(j) that are required according to the invention, characterize in a certain way the entire transmission path. When the transmitted data stream is known for a short time, the coefficients are determined experimentally with sufficient accuracy. For use of the invention, however, it has proven advantageous to loop a suitable controllable bandpass filter into the transmission path in addition to the non-ideal communications channel. By means of such a filter, the characteristics of the transmission path can be experimentally influenced so that there results a better approximation of the optimization problems, which are central to the invention, to the real conditions by optimal adaptation of the coefficients A(j). Another advantage of such a filter is the suppression of uncontrolled disturbances which stem from real communications channels, and the filtering out of frequency ranges that are irrelevant in the context of the present frequency-shift keying method or are assigned to other transmission tasks.

Consequently, according to the invention, the receive sequence {E(n)} is approximated as well as possible by linear combinations of a possible transmit sequence {S(n)} and thus the information content is recovered. This decoding technique is explained below in more detail for a specific frequency-shift keying method.

In the following expressions, T(i) values are to be m+1 different positive values and N is to be an even integer, where each of the T(i) values is the time length of a cosine halfwave from peak value to peak value. For arbitrary indices n(1), ..., n(N), each of which is greater than or equal to 1 and less than or equal to m, an ac signal W(t) in the time range from 0 to $$X(W) = 2T(0) + \sum_{i=1}^{N} T(n(i)) \quad (5)$$

is then defined by the formula $$W(t) = \quad (6)$$

$$\begin{cases} \cos\left(\pi\left(\frac{t}{T(0)} - 1\right)\right), \text{ for } 0 \leq t \leq 2T(0) \\ (-1)^{j+1} \cos\left(\pi\left(\frac{t - 2T(0) - \sum_{i=1}^{j-1} T(n(i))}{T(n(j))} - 1\right)\right), \text{ for} \\ 2T(0) + \sum_{i=1}^{j-1} T(n(i)) \leq t \leq 2T(0) + \sum_{i=1}^{j} T(n(i)) \end{cases}$$

In this ac signal W(t), Cosine halfwaves, each calculated from peak to peak, of frequencies 1/(2T(n(i))) are joined together in a phase-coherent and differentiable manner. Since the integral over W(t) in the limits from 0 to x(W) has the value 0, the ac signal W(t) has no dc component. Since N is even, the ac signals W(t) themselves can, in addition, be joined together in a phase-coherent manner. From combinatorial considerations, it follows that for fixed m, N, and T(0) to T(m), exactly $m^N$ different ac signals W(t) of the above-cited type can be formed. In general, these ac signals have different lengths X(W). However, if T(MAX) designates the maximum of the numbers T(1) to T(m), then for all possible ac signals: x(W)≦2T(0)+NT(MAX).

Data transmissions are usually based on 256 different characters, each of which is formed by eight bits with the states "0" and "1". One signal W(t) is then assigned uniquely to each or to combinations of the 256 characters for data transmission over communications channels, this assignment being made at the transmitter end and stored at the receiver end. For example, if N=8, m=2, T(0)=240 μs, T(1)=200 μs and T(2)=160 μs, then by means of the three frequencies 2083 Hz, 2500 Hz and 3125 Hz, the above formula defines 256 different ac signals W(t), each of which has a maximum length of 2080 μs.

These three frequencies normally lie sufficiently within the passband of a speech channel. Hence, at least 480 characters data per second can be transmitted. This corresponds to 4800 bits/second, which has not yet been attained heretofore with frequency-shift keying methods. If one chooses m=4, T(0)=240 μs and T(i)=152+16(i-1) μs for i=1–4, then only frequencies between 2083 Hz and 3290 Hz are obtained. Thus, by encoding two characters into one signal W(t), there results a possible throughput of at least 960 characters per second. Such a throughput has been attainable heretofore only in devices operating according to the QAM method via good quality speech channels.

The method according to the invention for the decoding of thus formed ac signals W(t) at the receiving end of communications channels is reduced to a determination of a sequence {E(n)} which reproduces, in sequence, the time intervals between adjacent peaks, and, by way of example, to the solution of the optimization problems $$\sum_n |F(n)| = \text{MINIMUM} \tag{7}$$

where F(n), the error margin of the linear approximation of E(n) by a possible transmit sequence {(X(n)}, is defined by $$F(n) = E(n) - (AX(n-1) + BX(n) + CX(n+1)) \tag{8}$$

with constants A, B, and C which satisfy the condition $A+B+C=1$. Here, $$\sum_n |F(n)|$$

is used as the measure of affinity between (E(n)) and $AX(n-1)+BX(n)+CX(n+1))$.

It is therefore a principal object of the invention to provide a method of simple encoding a frequency-shift keyed signal at the transmission end of a non-ideal communications channel and of efficiently decoding the received signal at the receiving end to provide a high data bit rate.

It is another object of the invention to provide a method of decoding a received FSK signal by measuring a sequence {E(n)} of time intervals between adjacent zero crossings, or adjacent peak values of the signal, and thereafter deriving therefrom the sequence {S(n)} used at the transmission end, utilizing a set of transmission channel coefficients.

It is still another object of the invention to provide apparatus for receiving FSK data signals at the end of a non-ideal communications channel to optimally decode the signals to determine a best estimate of the transmitted data.

It is yet another object of the invention to provide apparatus for encoding streams of data characters as sequences of halfwave sinewave segments of varying time periods joined phase-coherently and transmitting such sequences over a non-ideal communication channel.

It is another object of the invention to provide apparatus for receiving perturbed sequences of halfwave segments of varying time periods joined phase-coherently, measuring time intervals between zero crossings, or peak to peak portions of the halfwave segments, and comparing the measured time sequences with stored sequences thus determining measures of affinity by using error margins for each stored sequence.

These, and other objects and advantages of the invention will become more apparent from the following detailed description of a preferred embodiment of the invention when read in conjunction with the drawings.

DETAILED DESCRIPTION OF THE PREFERRED EMBODIMENT

Figure 1:
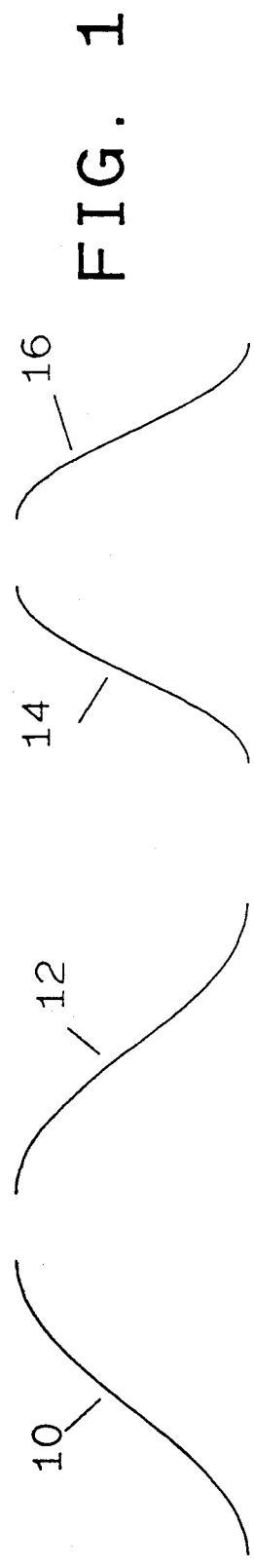
FIG. 1 shows a set of halfwave sinusoidal waveforms used to produce a typical differentiable cosine-based FSK signal.
Figure 2:
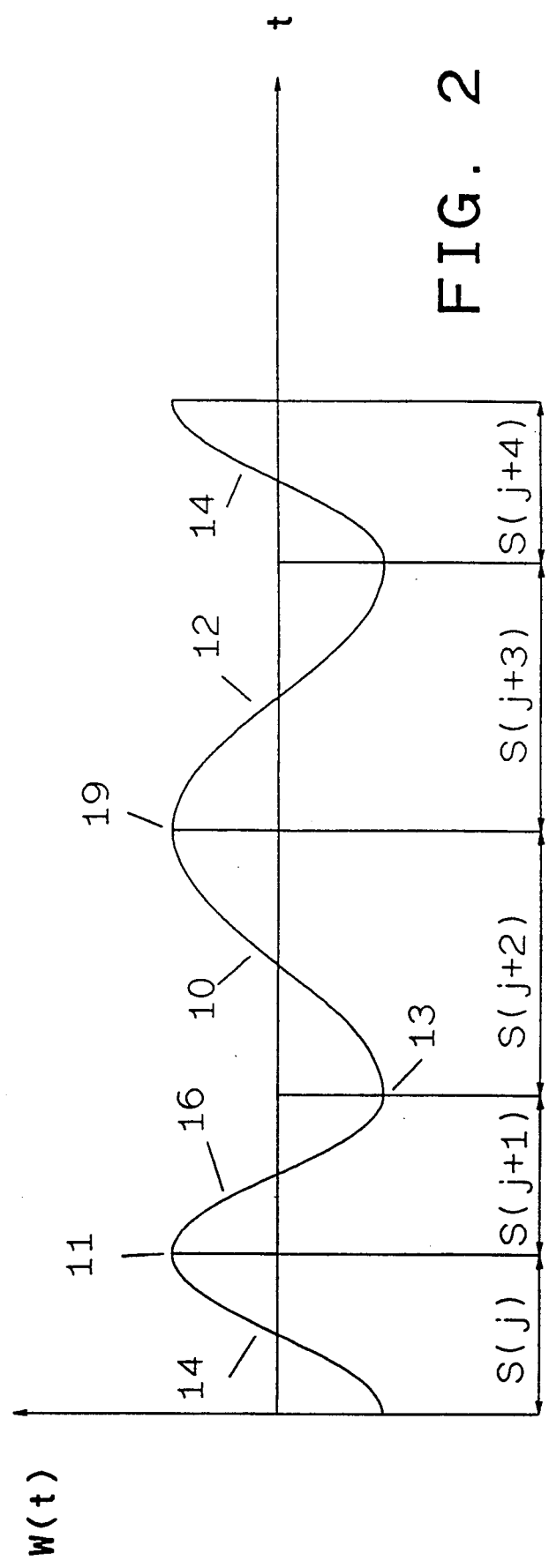
FIG. 2 shows a portion of an FSK signal formed from the waveforms of FIG. 1.

FIGS. 1, 2, 3 and 4 show waveforms used to generate phase-coherent cosine-based or sine-based FSK signals in accordance with the invention. In FIG. 1, waveform 10 is half of a cosine wave of a first frequency $f_1$, and waveform 12 is the following half of the cosine wave of frequency $f_1$. Similarly, waveforms 14, 16 are halves of a second and higher frequency $f_2$. In FIG. 2, the waveforms of FIG. 1 have been combined to produce a sequence of differentiable frequency-shifted waveforms. The frequency $f_1$ is represented by measuring the time period of peak value 13 to peak value 19, thereby defining S(j+2). A typical data character may be formed from a sequence of these halfwave segments by utilizing an $f_1$ halfwave as a "0" and an $f_2$ halfwave as a "1".

Figure 3:
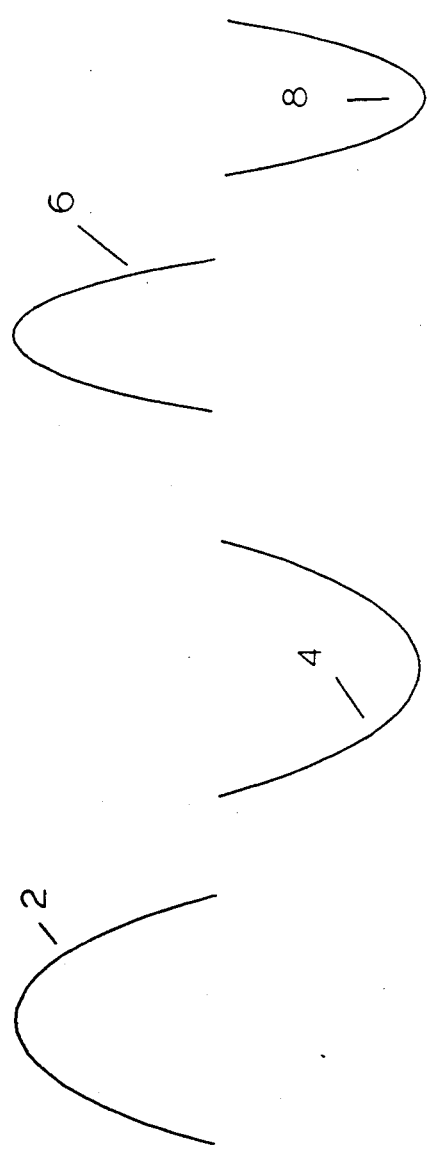
FIG. 3 shows a set of halfwave sinusoidal waveforms used to produce a typical phase-coherent sine-based FSK signal.
Figure 4:
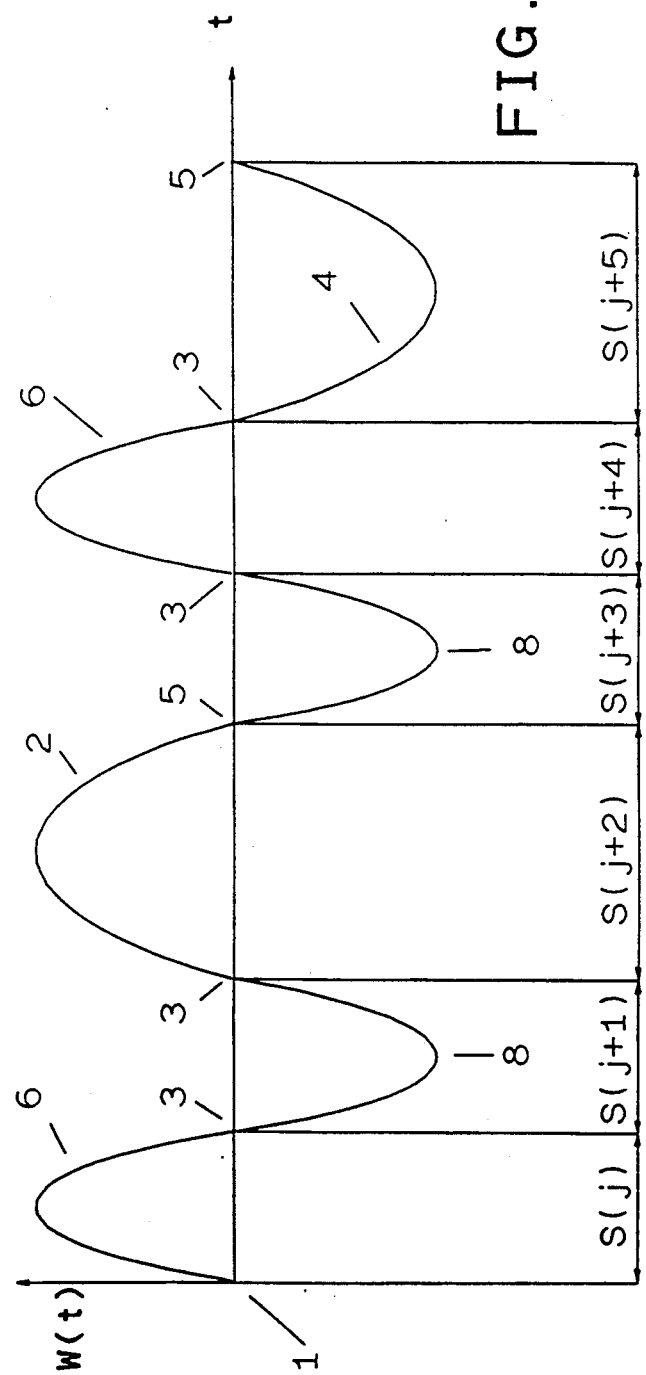
FIG. 4 shows a portion of an FSK signal formed from the waveforms of FIG. 3.

FIG. 3 shows a set of halfwave sinewaves, with waveform 2 showing a halfwave sinewave of frequency $f_1$, with waveform 4 being a following half of sinewave of frequency $f_1$. Similarly, halfwaves 6 and 8 are for a frequency $f_2$. The half sinewaves of FIG. 3 are combined in FIG. 4 to show an exemplary sequence of time periods S(j) to S(j+5). The periods are defined by the zero crossings 3 and 5. For example, crossings 3—3 may represent a "1", and crossings 3–5 may represent a "0".

Figure 5:
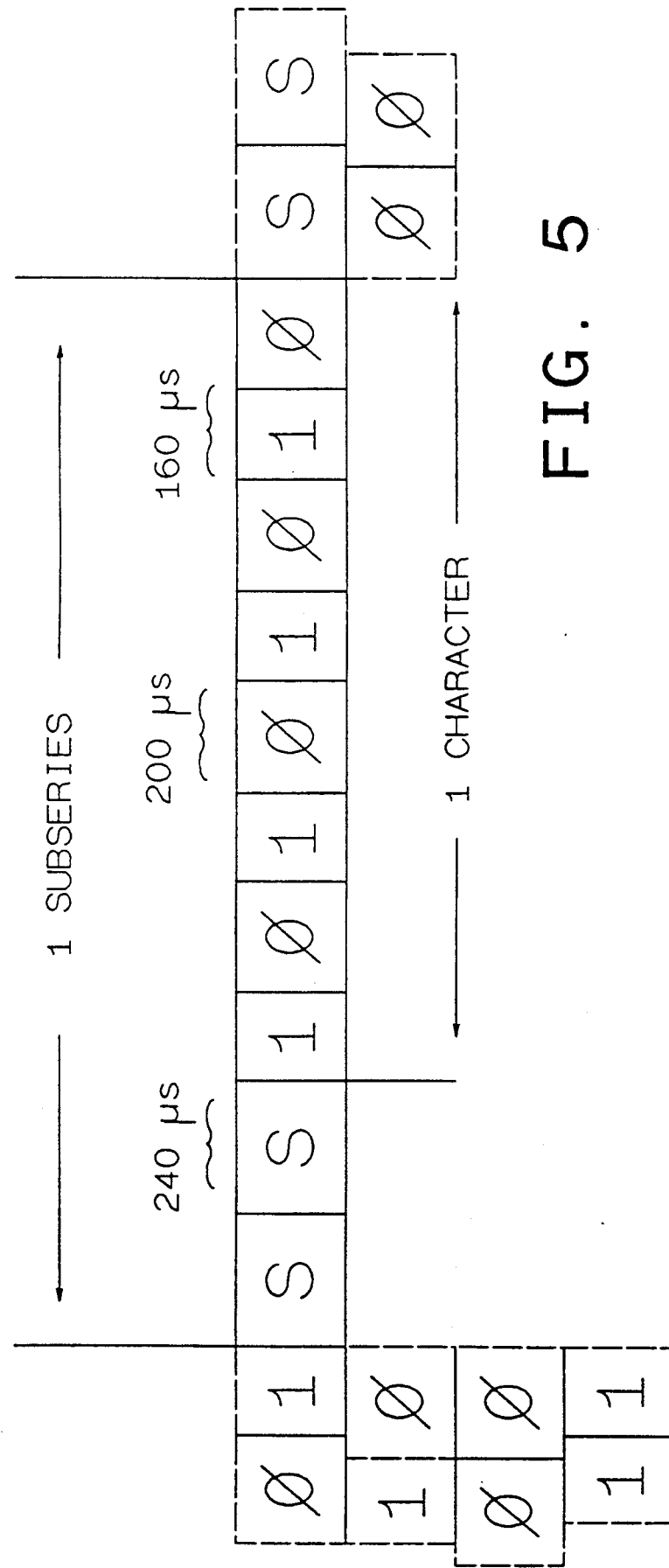
FIG. 5 shows a typical sequence for an 8-bit character set, indicating possible prior and following elements.

FIG. 5 illustrates a signal sequence for an ASCII character. The sequence includes 10 elements, with two leading elements, each having a duration of T(0)=240 μs that indicate the start of a character sequence. The following 8 bits can define 256 characters. For purposes of illustration, a character 10101010 is shown. Each "1" is a halfwave segment of a cosine wave, such as 14 or 16 of FIG. 1 and has a duration of 160 μs, and a frequency of 3125 Hz. Each "0" is a halfwave cosine wave segment, such as 10 or 12 of FIG. 1, having a duration of 200 μs, and a frequency of 2500 Hz. The 240 μs start bits are halfwaves of a 2083 Hz cosine wave.

Also shown in FIG. 5 are possible preceding and following elements which can produce intersymbol influence on the character sequence. To maintain a channel characteristic when no data is being sent, a continuing sequence of two zeros each is transmitted.

Thus, at the trailing end of the sequence, two start symbols or two zero symbols could be received.

It is to be understood that assignments of different bit lengths than illustrated or multiple bit encoding into one frequency may be utilized to implement the invention.

Figure 6:
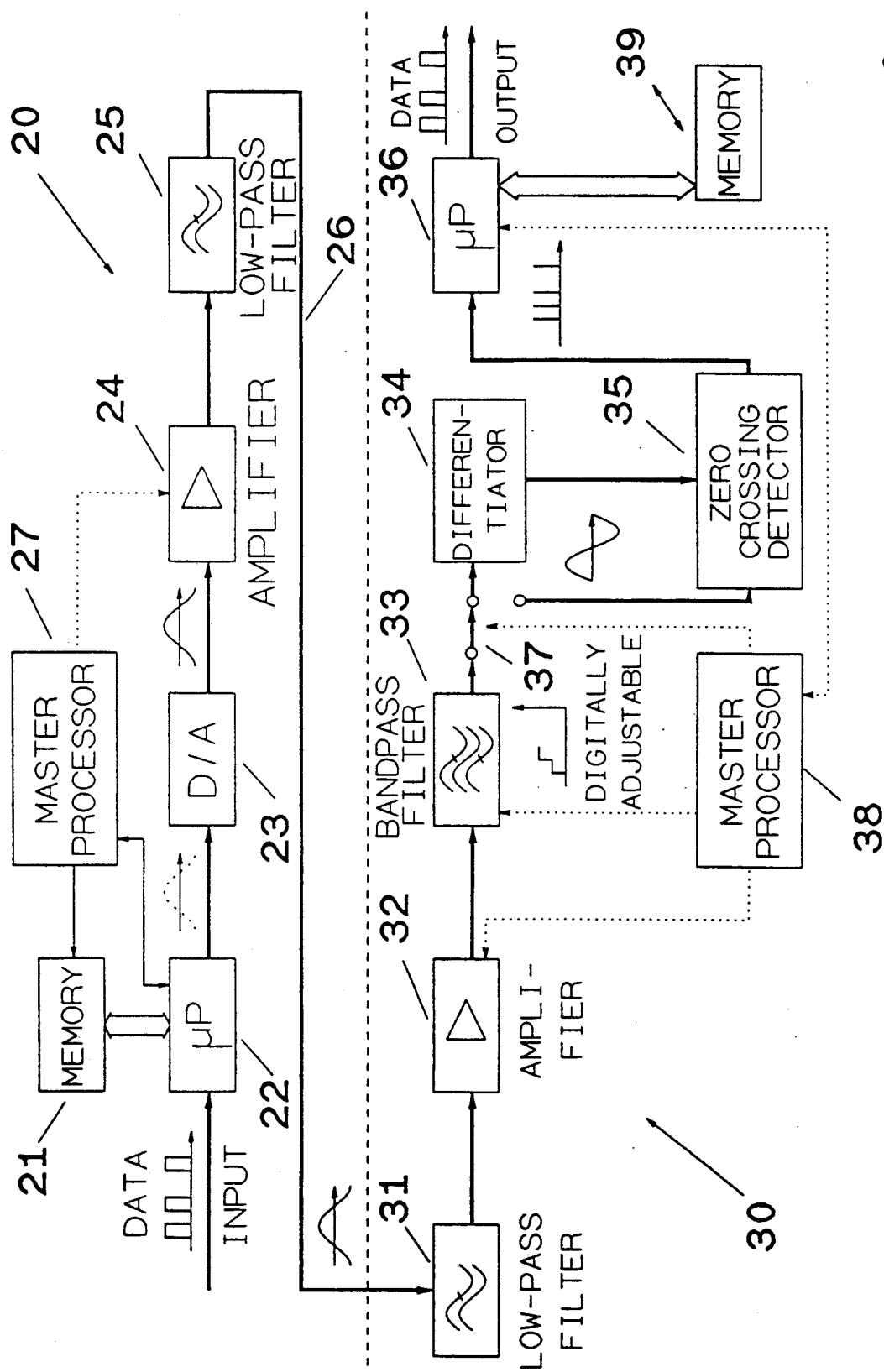
FIG. 6 is a block diagram of the system of the invention showing a transmitter, and a receiver.

The circuit configuration according to FIG. 6 shows a transmitter 20 and a receiver 30 in accordance with the invention. When no data is to be sent, the transmitter 20 continuously transmits fullwaves of a fixed frequency which is prescribed by one of T(1) to T(m), say T(p), where T(i) represents the duration of halfwave signal elements. This mode maintains the transmission path in the steady state.

If the transmitter is to transmit a data character, it assembles a sequence of the type of FIG. 5 by means of a prescribed table to provide an FSK signal W(t) of above-defined type and inserts this ac signal into its continuous transmit signal phase-coherently. Assuming for exemplary purpose that cosine halfwaves of FIGS. 1 and 2 are used, the function values of such cosine halfwaves are stored in digitized form in memory 21. A data character to be transmitted is received by microprocessor 2 which prepares the uniquely assigned sequence of cosine halfwaves of the above-described type, and keys the corresponding function values at the appropriate times properly inserted into its transmit signal. If no data character is present for transmission, the microprocessor 22 continuously keys the function values of a predetermined cosine fullwave of frequency 1.

The conversion of the digitized function values into a continuous analog signal occurs in the following digital to analog (D/A) converter 23. The resulting signal is passed through an amplifier/attenuator 24, controlled by a master processor 27, and a low-pass filter 25 in order to condition the signal for the non-ideal transmission link 26.

In the receiver 30, the signal passes first through a low-pass filter 31 and an amplifier/attenuator 32, controlled by a master processor 38 to condition the signal for the evaluation circuits.

In the bandpass filter 33, unessential frequencies are suppressed and, if necessary, the signal is further filtered for a more-optimal decoding, such as by compensation for group delays. Bandpass filter 33 includes advantageously a switched capacitor filter with digitally adjustable characteristic and a high clock frequency. Thus, bandpass filter 33 can be adjusted by means of the master processor 38 to efficiently manipulate and match the channel 26 characteristics.

The signal from the bandpass filter 33 is supplied to a differentiator 34. If the signal was already differentiated in the channel 26, the differentiator 34 can be eliminated. In that case, the bandpass filter is connected directly to the zero crossing detector 35 by switch 37. Zero crossing detector 35 receives the differentiated signal, and generates a sequence of pulses which are evaluated by the microprocessor 36. The latter counts the time intervals between the pulses, thus determines, in sequence, the time intervals between adjacent zero crossings or peaks of the output signal of the bandpass filter 33 and so obtains the required receive sequence {(E(n)}.

The remainder of the process is performed by the microprocessor 36 in conjunction with memory 39 using preselected coefficients A, B, and C, as described hereinabove.

The processing of the time durations E(n) derived from the pulses from detector 35 will be explained below in detail for the case N=8 and m=2, with "0" being assigned to the time T(1), "1" to the time T(2), and "S" being assigned to T(0), although it is to be understood that other values or assignments may be used for the transmitted signals. For the example of FIG. 5, T(0), is 240 μs, T(1) is 200 μs, and T(2) is 160 μs.

As will be recognized, the elements of the sequence {(E(n)} each represent a detected time duration. For the example of FIG. 5, the sequence {(S(n)} defining the transmitted ac signal will include: 240; 240; 160; 200; 160; 200; 160; 200; 160; and 200 microseconds. The values of the corresponding obtained E(n) will vary from the transmitted values due to channel distortions, which produce intersymbol interference and delay variations.

For each ten values in sequence, say $E(i+1)$ to $E(i+10)$, the microprocessor 36 uses the knowledge of the law of encoding of the frequency-shift keying method under consideration and the knowledge of the decoding method according to the invention, which say that these values E(n) represent a data character with the bit values b(1) to b(8), each of which can assume the values 0 and 1, only if in good approximation:

$$\begin{aligned} \text{i) } & E(i + 1) = AT(0) + BT(0) + CT(1 + b(1)); \\ \text{ii) } & E(i + 2) = AT(0) + BT(1 + b(1)) + CT(1 + b(2)); \end{aligned} \quad (9)$$

$$\text{iii) } E(i + j + 1) = AT(1 + b(j - 1)) + BT(1 + b(j)) + \\ CT(1 + b(j + 1)), \text{ for } j = 2 \text{ to } 7;$$

$$\begin{aligned} \text{iv) } & E(i + 9) = AT(1 + b(7)) + BT(1 + b(8)) + CT(u); \text{ and} \\ & E(i + 10) = AT(1 + b(8)) + BT(u) + CT(u)). \end{aligned}$$

with u=0 or u=p, where p indicates the preselected T(p) and A=B=C=1.

Here it is taken into consideration that a preferred signal of the frequency-shift keying method of the invention representing one data character is always initiated with a cosine fullwave of period 2T(0) and terminated with a cosine fullwave of period 2T(0) or of period 2T(p).

Consequently, for the 2×256=512 possibilities with fixed A, B, and C coefficients, the microprocessor 36 determines the permissible target value series of length 10 using the right sides of the equations (i) to (iv) above and stores them in memory 39.

For each target value series Z(1) to Z(10), microprocessor 36 forms the total error.

$$TE(Z) = \sum_{j=1}^{10} |E(i + j) - Z(j)| \quad (10)$$

If all total errors exceed a preselected bound, then, with high certainty, the values $E(i+1)$ to $E(i+10)$ were not generated by a transmission activity of the frequency-shift keying method of the invention and the sequence is disregarded. The microprocessor 36 therefore rejects the first count value $E(i+1)$, joins the immediately following count value to the remaining nine count values, and then analyzes those ten values in the above-described manner. However, if there is at least one total error that does not exceed the prescribed bound, the right bits b(1) to b(8) that has the lowest total error TE is determined. The microprocessor 36 then determines the character belonging to those light bits, marks it as decoded and received, discards the observed values E(i+1) to E(i+10) and analyzes the immediately following ten count values in the described way.

The microprocessor 36 is advantageously equipped with processing devices that can be utilized in parallel in order to be able to carry out the part of the process assigned to it in the available time (in the example: 480+8·160=1760 µs for the worst case).

Figure 7:
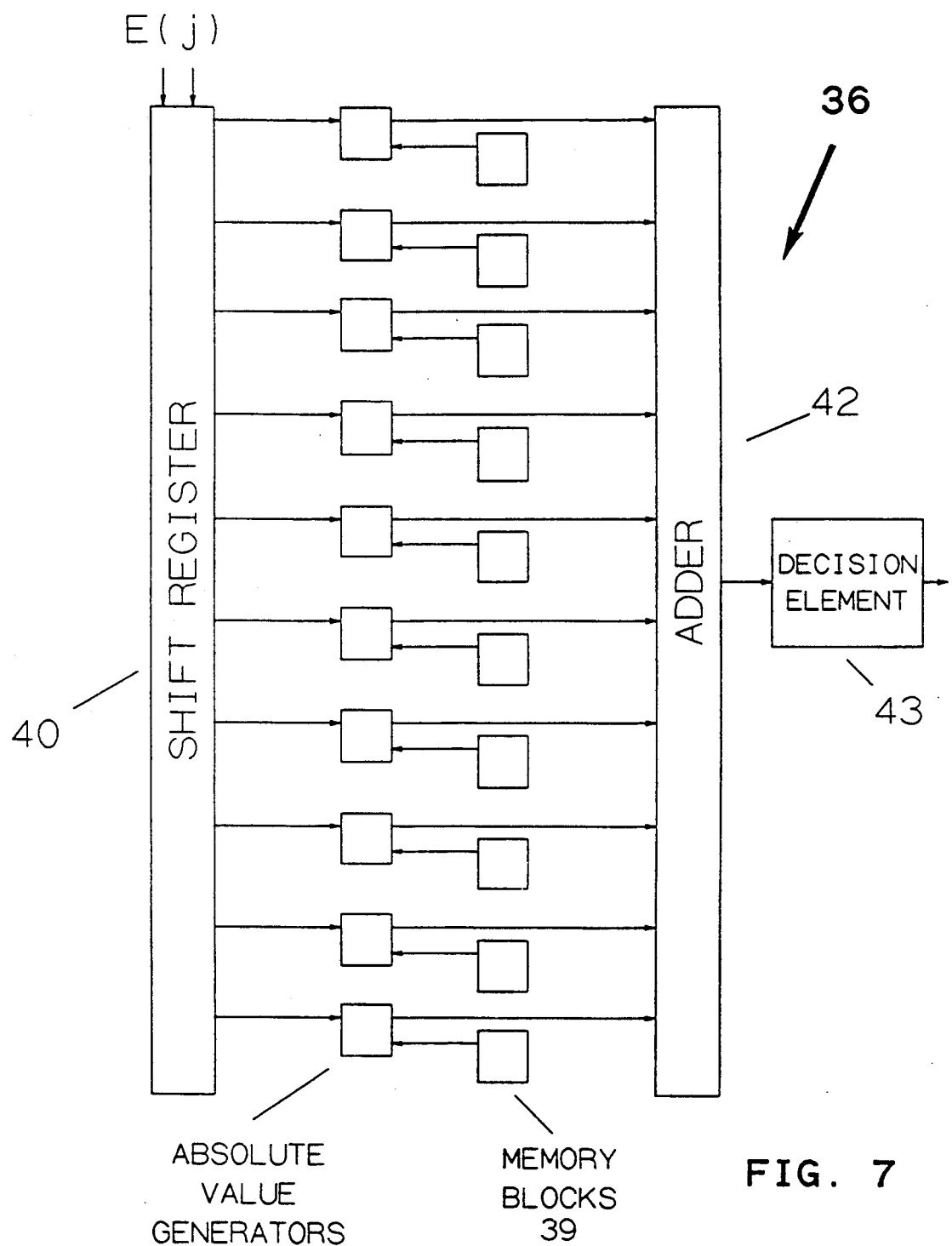
FIG. 7 is a block diagram of a portion of the receiving microprocessor of FIG. 6.

By way of example, FIG. 7 shows the essential part of the structure of such a microprocessor 36. The count values E(j) are sent to the shift register 40. When ten values are present, parallel-connected absolute-value generators 41 take over the count values assigned to them, read from their memory blocks 39 the possible target values calculated in advance for the prescribed coefficients A, B, and C, form the differences relative to the E(j), then the absolute magnitude, and finally send these values to an adder 2 which sends the corresponding total error to a decision element 43. This occurs for all 512 of the cases to be considered, and the decision element 43 determines for which underlying light bits the minimum is attained. If such minimum value falls below the prescribed bound, it passes on the recognized character and causes shift register 40 to be switched forward by ten values; otherwise, it causes the shift register 40 to be switched forward by one value.

As an alternative to the detailed complete enumeration of all 512 possible cases, the mathematical theory of optimization provides formulas that require only a fraction of the sketched processing steps and yield nearly equally good results. An ordinary signal processor can then be used as the microprocessor 36.

It has been found that the bounds, the setting of the bandpass filter 33, and the choice of the coefficients A, B, and C can be determined relatively simply and with sufficient accuracy by means of a few experiments. These values can then be retained for communications channels that vary within the normal range of fluctuation. Experiments have shown that in the long-term behavior, a minimum total error TE(Z) of only 12 to 23 µs was found. A further advantage of the frequency-shift keying method, described by way of example, is that frequency drifts in communications channels of up to 6 Hz have essentially no detrimental effect. Moreover, since the method is asynchronous and without difference coding, no error propagation can occur.

As will now be recognized, the preferred embodiment of the invention comprises a novel system for encoding FSK signals using halfwave sinewave elements for data characters in a transmitted signal, and a decoder that produces a receive sequence by measuring either peak to peak values, or zero to zero crossings, to recover transmitted data characters. The received sequence is compared to possible resulting sequences for all data characters stored at the receiving end, and the one having the minimum error is selected as the transmitted character.

Figure 8:
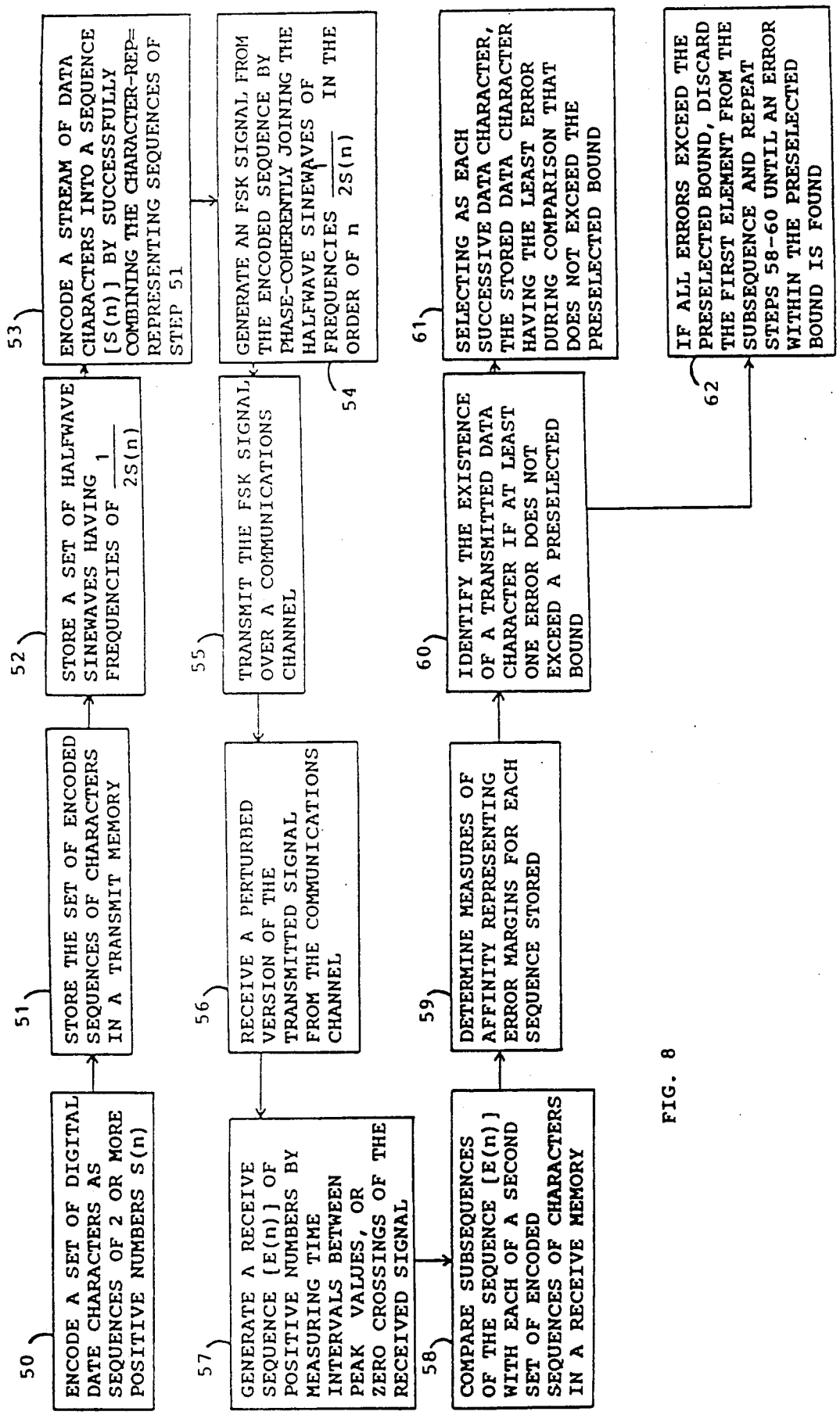
FIG. 8 is a flow diagram of a method of the invention.

In summary, FIG. 8 is a flow diagram of a typical method in accordance with the invention. As will be noted, the transmit method is defined by steps 50-54, and the receiver method by steps 56-62.

Although specific frequencies, bit combinations, start element usages, specialized optimization problems, and preferred embodiments have been disclosed, changes may be made thereto without departing from the spirit and scope of the invention.

What is claimed is:

1. A method for encoding and decoding a frequency-shift keyed data signal for transmission over a non-ideal communications channel, comprising
    a) generating a frequency-shift keyed data signal by phase-coherently combining multiple frequency, halfwave sinewave segments for transmission over the communications channel;
    b) encoding a stream of data characters into a transmit ac signal comprising a plurality of the multiple frequency sinewave segments;
    c) transmitting the ac signal encoding the stream of data characters over the non-ideal communication channel;
    d) receiving the ac signal from the non-ideal communication channel;
    e) identifying the received ac signal by determining the time periods between peak values thereof, or between zero crossings thereof;
    f) comparing the sequence of time periods with each of a set of stored sequences each representing streams of data characters; and
    g) selecting as the transmitted stream of data characters, the one represented by the stored sequence producing the smallest error during such comparison.

2. The method as defined in claim 1 in which step b) includes the steps of:
    h) encoding at least one start element per data character by a first frequency half sinewave;
    i) encoding a "0" data bit of a data character by a second frequency half sinewave; and
    j) encoding a "1" data bit of a data character by a third frequency half sinewave.

3. The method as defined in claim 1 in which step a) includes the step of selecting frequencies of the halfwave sinewave segments within the band of a voice channel.

4. The method as defined in claim 1 in which step d) includes the step of equalizing a receiving system to match characteristics of the communications channel.

5. The method as defined in claim 1 in which step b) includes the step of asynchronously encoding the stream of data characters.

6. A method for encoding and decoding a frequency-shift keyed data signal for transmission over a non-ideal communications channel, comprising the steps of;
    a) encoding an arbitrary stream of data characters into a transmit sequence $\{(S(n)\}$ of positive numbers enumerated by intergers n of an index set, such that each data character of said stream is represented by a subsequence $(S(i+1), \ldots, S(i+p))$ of length p, and such that the S(n) can only assume a finite number of preselected values;
    b) generating a frequency-shift keyed data signal by phase-coherently combining halfwave sinewave segments of frequencies $1/(2S(n))$ such that all halfwaves start at a peak value or at a zero crossing;
    c) transmitting the frequency-shift keyed data signal over the non-ideal communications channel;
    d) receiving a perturbed frequency-shift keyed data signal from the non-ideal communications channel;
    e) generating a receive sequence $\{E(n)\}$ of positive numbers by measuring the time intervals between consecutive peak values or consecutive zero crossings of the received perturbed frequency-shift keyed data signal;

f) comparing subsequences $(E(i+1), \ldots, E(i+q))$ of length q of said sequence $\{E(n)\}$ with each of a set of stored sequences $(Z(1), \ldots, Z(q))$ each of which represents a data character thereby determining measures of affinity representing errors for each stored sequence;

g) identifying the existence of a transmitted data character when, during the step of comparing, at least one error does not exceed a preselected bound; and h) selecting, from the identifying step, as the transmitted character the character represented by the stored $(Z(1), \ldots, Z(q))$ which yields the smallest error during the comparing step.

7. The method as defined in claim 6 in which step a) includes the use of frame and fill elements to asynchronously encode any stream of data characters.

8. The method as defined in claim 6 in which step a) encodes at least one bit into a single number S(n) so that single halfwave sinewave segments of step b) fully represent bit information.

9. The method as defined in claim 6 in which step a) includes the steps of:

i) encoding for each data character at least one start element by a first preselected value;

j) encoding a "0" data bit of a data character by a second preselected value;

k) encoding a "1" data bit of a data character by a third preselected value; and l) using one of the second and third preselected values to encode fill elements when a need arises.

10. The method as defined in claim 6 in which step a) includes the step of choosing the preselected values for the sequence such that the resulting frequencies $1/(2S(n))$ are within the bandwidth of a voice channel.

11. The method as defined in claim 6 in which step d) includes the step of equalizing the characteristics of the non-ideal communications channel.

12. The method as defined in claim 6 in which the stored sequences $(Z(1), \ldots, Z(q))$ of steps f) and h) are defined by the equations:

$$Z(n) = \sum_{j=-s}^{+t} A(j)S(n + i + j)$$

where s, t are preselected integers, A(j) are $t+s+1$ preselected constants with a total sum of 1, and the $S(n+i+j)$ are $q+t+s$ numbers which may appear consecutively in a transmit sequence $\{S(n)\}$ such that $(S(i+1), \ldots, S(i+p))$ represents a data character as in step a).

13. The method as defined in claim 6 in which steps f), g), and h) use an affinity measure:

$|(F(1), \ldots, F(q))|$ where $|\ \ |$ assigns a non-negative number to each sequence $(F(1), \ldots, F(q))$ and the F(n) are defined by the equations:

$F(n) = E(i+n) - Z(n)$.

14. The method as defined in claim 6 in which three different positive values S are used and each data character is represented by a subsequence $(S(i+1), \ldots, S(i+10))$ such that:

d) $S(1+1)$ and $S(i+2)$ are equal to the first preselected value;

e) $S(i+2+j)$ for $j=1$ to 8 is equal to the second preselected value if the j-th bit of the data character is "0"; and f) $S(i+2j)$ for $j=1$ to 8 is equal to the third preselected value if the j-th bit of the data character is "1".

15. A system for asynchronous transmission of digital data over a non-ideal communications channel comprising:

a) means for generating halfwave sinewave segments of varying frequencies;

b) means for encoding streams of data characters as a plurality of said halfwave sinewave segments, joined phase-coherently, wherein each segment constitutes frame, data, or fill elements, thereby producing a continuous, asynchronous frequency-shift keyed data signal;

c) means for transmitting said frequency-shift keyed data signal over said non-ideal communications channel;

d) means for receiving a perturbed frequency-shift keyed data signal of said kind;

e) means for measuring time intervals between preselected indicia points of said perturbed frequency-shift keyed data signal;

f) means for comparing finite numbers of consecutive time intervals of said kind with sequences of stored times to thereby determine the information content of the said perturbed frequency-shift keyed data signal; and g) means for calculating and storing said sequences.

16. Apparatus for receiving and decoding sequences of digital data transmitted over a communications channel as sequences of phase-coherent halfwave sinewave signals in which a preselected number of sequential halfwaves of the sequences are representative of a data character, comprising:

a) signal input means for receiving the transmitted sequences of halfwave sinewave signals;

b) means connected to the input means for measuring the time periods between consecutive zero crossings or peaks of the received signals; and c) computer means connected to the measuring means and having a memory storing at least one representation of each possible transmitted data sequence as a sequence of time periods for comparing each received sequences of time periods to each of the stored sequences of time periods, and for outputting as a transmitted data stream the one represented by the stored sequence closest to the received sequence.

17. The apparatus as defined in claim 16 in which the measuring means includes:

a) a differentiator for differentiating the received signals; and b) a zero crossing detector for producing a pulse at each zero crossing of the differentiated received signals.

18. A method for decoding a frequency-shift keyed ac signal transmitted over a non-ideal communications channel comprising the steps of:

a) receiving a frequency-shift keyed ac signal from the non-ideal communications channel;

b) generating a sequence $\{E(n)\}$ of positive numbers by measuring the time intervals between consecutive peak values or consecutive zero crossings of the received frequency-shift keyed ac signal;

c) comparing said sequence {E(n)} to each of a set of stored sequences each representing a stream of none, one or more data characters thereby determining error margins for the stored sequences;

d) identifying each of said sequences having an error margin less than a preselected bound; and e) selecting as the transmitted stream of none, one or more data characters the one from the identified sequences which corresponds to the stored sequence which yields the smallest error margin during the comparing step.

19. The method as defined in claim 18 in which step a) includes the step of equalizing characteristics of the non-ideal communications channel.

20. The method as defined in claim 18 in which the stored sequences {Z(n)} are defined by the equations:

$$Z(n) = \sum_{j=-s}^{+t} A(j)S(n+j)$$

where s, t are preselected integers, A(j) are $s+t+1$ preselected constants with a total sum of 1, and {S(n)} is a sequence of positive numbers which can be derived at the transmitter end by measuring the time intervals between consecutive peak values or consecutive zero crossings of the frequency-shift keyed ac signal representing a stream of none, one or more data characters such that the sequence {Z(n)} represents said stream of none, one or more data characters.

21. The method as defined in claim 18 in which the error margins are defined by:

$$|(F(n))|$$

where | | assigns a non-negative number to each sequence (F(n)) and the F(n) are defined by $F(n) = E(i+n) - Z(n)$.

* * * * *

UNITED STATES PATENT AND TRADEMARK OFFICE
CERTIFICATE OF CORRECTION

PATENT NO. : 5,103,463

DATED : April 7, 1992

INVENTOR(S) : Rainald Schoeneberg

It is certified that error appears in the above-identified patent and that said Letters Patent is hereby corrected as shown below:

| COLUMN | LINE | CORRECTION |
|---|---|---|
| Abstract | Last | change "receiver" to --receive-- |
| 2 | 44 | change "differentially" to --differentiably-- |
| 3 | 22 | change " $|(F(n))|$ " to -- $\|(F(n))\|$ -- |
| 3 | 33 | change " $|(F(n))|$ " to -- $\|(F(n))\|$ -- |
| 3 | 54 | change "(X(n)" to --(X(n)}-- |
| 4 | 11 | change "(E(n)} " to -- {E(n)} -- |
| 5 | 03 | change "characters data" to --data characters-- |
| 5 | 27 | change " {(X(n)} " to -- {X(n)} -- |
| 5 | 38 | change "AX(n-1)+BX(n)+CX(n+1))" to --(AX(n-1)+BX(n)+CX(n+1))-- |
| 6 | 62 | change "bits" to --elements-- |
| 7 | 03 | delete "bit" |
| 7 | 29 | change "1" to --1/(2T(p))-- |
| 7 | 62 | change " {(E(n)} " to -- {E(n)} -- |
| 8 | 08 | change " {(E(n)} " to -- {E(n)} -- |
| 8 | 09 | change " {(S(n)} " to -- {S(n)} -- |
| 8 | 34 | change "CT(u;" to --CT(u);-- |
| 8 | 35 | change "CT(u))." to --CT(u).-- |
| 8 | 37 | change "A=B=C=1" to --A+B+C=1-- |
| 8 | 66 | change "right bits" to --eight bit sequence-- |
| 8 | 68 | change "light" to --eight-- |
| 9 | 18 | change "adder 2" to --adder 42-- |
| 9 | 21 | change "light" to --eight-- |
| 9 | 54 | change "received" to --receive-- |
| 9 | 62 | change "receiver" to --receive-- |
| 10 | 03 | after "comprising" insert --the steps of:-- |
| 10 | 49 | change " {(S(n)} " to -- {S(n)} -- |
| 10 | 50 | change "intergers" to --integers-- |
| 11 | 34 | after "sequence" insert -- {S(n)} -- |
| 11 | 67 | change "S(1+1)" to --S(i+1)-- |

Page 1 of 2

UNITED STATES PATENT AND TRADEMARK OFFICE
CERTIFICATE OF CORRECTION

PATENT NO. : 5,103,463
DATED : April 7, 1992
INVENTOR(S) : Rainald Schoeneberg

It is certified that error appears in the above-indentified patent and that said Letters Patent is hereby corrected as shown below:

| Column | Line | |
|---|---|---|
| 12 | 04 | change "S(i+2j)" to --S(i+2+j)-- |

Signed and Sealed this

Eighth Day of June, 1993

Attest:

MICHAEL K. KIRK

Attesting Officer     Acting Commissioner of Patents and Trademarks